Jan. 5, 1954 G. A. SCHEMM 2,665,035
AERATING DEVICE FOR PULVERULENT MATERIAL
Filed Dec. 27, 1948
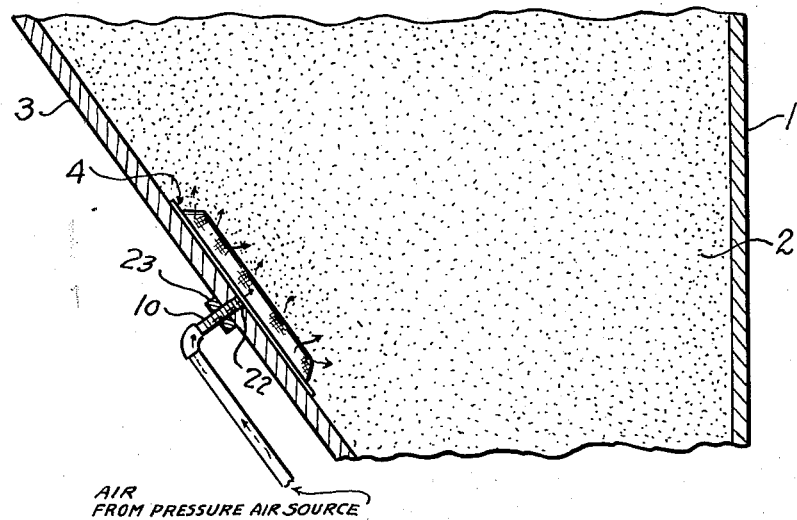
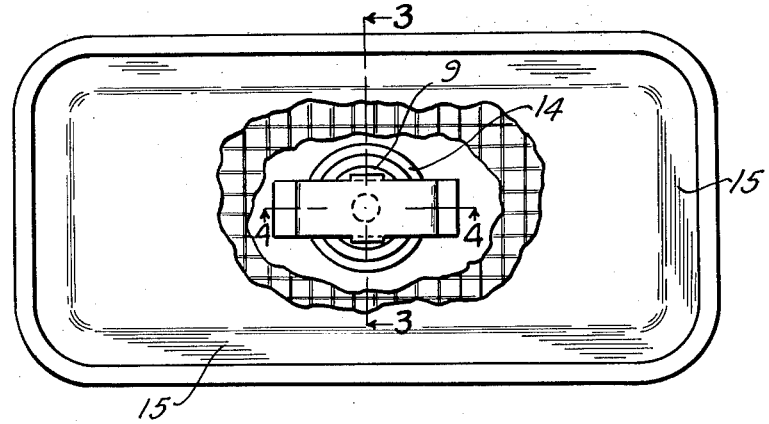
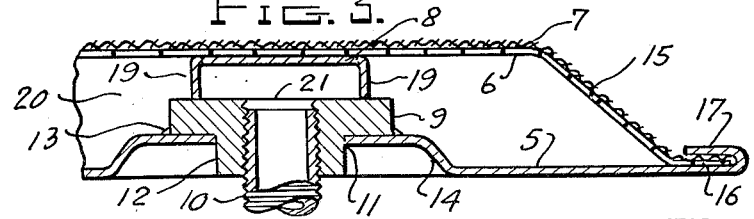
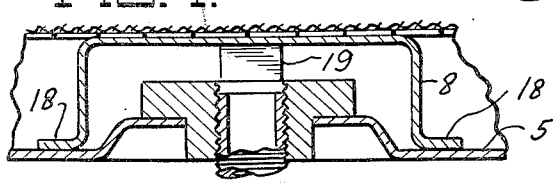
INVENTOR.
George A. Schemm
BY
Barnes, Kisselle, Laughlin & Raisch
ATTORNEYS Patented Jan. 5, 1954

2,665,035

UNITED STATES PATENT OFFICE 2,665,035

AERATING DEVICE FOR PULVERULENT MATERIAL

George A. Schemm, Detroit, Mich., assignor to Huron Portland Cement Company, Detroit, Mich., a corporation of Michigan Application December 27, 1948, Serial No. 67,533

10 Claims. (Cl. 222—195)

This invention relates to an aerator and more particularly to an aerator for injecting low pressure air into pulverulent material to promote flow of the material out of a bin or down an inclined chute.

An aerator for pulverulent material is not broadly new. In aerators heretofore used it has been customary to use porous filter stone as the porous medium through which the air passes and is diffused preparatory to entering the pulverulent or powdered material. The filter stone consists of small particles or grains of silica bonded together in the form of a slab. Filter stone is frangible and very easily broken in shipment and in use.

Another disadvantage of filter stone is that the powdered material tends to plug the pores of the same and particularly if the filter stone type of aerator is used under humid conditions or left standing in non-use for any length of time under humid conditions.

Another disadvantage of the porous type filter stone aerator is that the thermal expansion rate of the filter stone is different from that of the cast iron housing or base upon which it is mounted and when the aerator is used with hot materials, say, for example, 250 to 300° F., due to the different thermal expansion rates of the filter stone and its metal base, the filter stone will frequently crack or will break loose from its seal with the metal base and in either event the aerator will become inoperative because the air will pass through the crack in the filter stone or the crack in the seal and bypass the filter stone.

The nature of filter stone is such that it must be made relatively thick, say, for example, in the neighborhood of at least three-quarters of an inch, otherwise it will not properly diffuse the air or have sufficient strength to withstand the weight of the material such, for example, as the head of cement in a cement silo. Due to the fact that the porous block must be made relatively thick, the aerator itself will have a corresponding thickness and when placed upon the inclined sides of a chute or bin will afford considerable obstruction to the powdered material so that the powdered material will build up on the floor of the bin above the aerator and the bin will not automatically clear itself of the material which it is sought to remove from the bin.

It is the object of this invention to produce an aerator which overcomes all of the above disadvantages of the filter stone type aerator, which is more economical to produce, more simple in structure, which can be subjected to considerable abuse in both use and handling without damage to the aerator and which can be used in the bottom of a bin without damaging or obstructing the flow of powdered material from the bin.

Fig. 1 is a fragmentary vertical section through a storage bin for powdered material showing one of several of my aerators installed therein.

Fig. 2 is a plan view of my aerator.

Fig. 3 is a section along the line 3—3 of Fig. 2.

Fig. 4 is a section along the line 4—4 of Fig. 2.

Referring more particularly to the drawings I have shown a storage bin 1 containing a finely ground or pulverulent dry material 2 such, for example, as cement or flour. The inclined bin wall is designated 3 and my aerator is generally designated 4. Although I have shown only one aerator 4 mounted in bin 1, in actual use a plurality of aerators will be used and located at points where the flow of the powdered material is restricted or tends to be restricted.

My aerator consists of a rectangular imperforate sheet metal base 5 having a wire mesh grid 6, a fabric diffuser 7, a stiffener 8, a bushing 9 and a nipple 10 threaded in bushing 9.

Base 5 is provided with a substantially centrally located opening 11 through which the neck 12 of bushing 9 extends. Bushing 9 is fixed to base 5 in any suitable manner and may be welded thereto as at 13. Neck 12 of bushing 9 preferably has a press fit in opening 11. Base 5 is provided with an upwardly raised circular portion 14 about opening 11 so that the outer face of neck 12 of bushing 9 will be substantially flush with base 5.

Fabric diffuser 7 takes the form of a web of finely woven fabric material. Diffuser 7 can be made from any one of numerous types of woven fabric material such, for example, as cotton cloth commonly called dust arrester or dust collector cloth, canvas, single ply or thicker multiple ply canvas material such as the well known cotton pulley belt material which is a multiple ply, finely woven fabric material which can be obtained in plies ranging, for example, from two to eight ply inclusive. Where my aerator is used with hot materials, then the woven fabric or cloth will be made of glass or asbestos fibers whereas where the material handled is at a temperature below the charring temperature of cotton fabric or canvas, then finely woven cotton materials will be used.

Since fabric 7 is highly flexible, I support fabric 7 with a grid 6 which is substantially rigid and preferably made from a perforated or foraminated material such as one-quarter inch galvanized wire mesh. It will be noted that the peripheral portion 15 of grid 6 tapers outwardly and inwardly from the periphery of base 5 at a relatively acute angle, for example, about 45°. The extreme outer peripheral edge 16 of grid 6 is parallel to base 5. Fabric 7 is drawn taut over grid 6 and the entire peripheral edges of fabric 7 and grid 6 are then clamped to base 5 by rolling the peripheral edge 17 of base 5 back over and downwardly against the peripheries of grid 6 and fabric 7. Stiffener 8 takes the form of an inverted U member of flat strip steel which is spot welded to base 5 as at 18. A pair of legs 19 are turned downwardly from stiffener member 8 and rest against the upper face of bushing 9 to thus provide support for the grid 6 in its mid-section. Grid 6 holds fabric 7 away from base 5 and cooperates with base 5 to provide an air chamber 20 which acts as a distributor for the air flowing into chamber 20 from nipple 10. Grid 6 always maintains the fabric diffuser 7 in spaced relation to air inlet 21 so that the air under pressure is distributed throughout chamber 20.

In use my aerator units will be located in the interior of the bin or chute at any point or points desired and may be located on the floor or on vertical or inclined walls at points where the flow of powdered material is restricted or tends to be restricted by arching or packing or settling of the powdered material being evacuated from the bin. Preferably low pressure air, two to five pounds gauge, will be supplied to each aerator unit 4 from a pressure line which will be connected to nipple 10 of each aerator. The air under pressure enters into chamber 20 of each aerator and then is diffused through fabric diffuser 7 into the powdered material. Aeration of the material causes the same to flow freely.

It is preferred to control the quantity of air flowing through each aerator. This is accomplished by computing the size of orifice 21 in relation to the pressure of the air fed therethrough. The permeability of fabric 7 is such that it will pass more air at any given pressure than will pass through orifice 21 at that presure so that the quantity of air is automatically controlled by fixed orifice 21.

In installing the aerator unit it is only necessary to provide one hole 22 per aerator 4 through the wall of the bin. Nipple 10 passes through this hole and the aerator is clamped in place by one lock nut 23. No other support for the aerator on the bin wall is necessary. It will be noted that when my aerator is installed on the inclined wall 3 of bin 1 that the tapered edge portion 15 of the aerator is substantially horizontal. The inclination of tapered edge portion 15 of the aerator should be coordinated with the angle of inclination of the wall on which the aerator is mounted so that preferably tapered edge portion 15 along the topmost edge of aerator 4 will be substantially horizontal or tapered slightly downwardly from the wall upon which it is mounted. When tapered edge portion 15 is thus aerated, the aerator will not affect or in any wise obstruct the flow of the powdered material from the bin. It should also be noted that air passes not only through the central portion of fabric diffuser 7 but also throughout the entire tapered edge portion 15 so that any powdered material resting against tapered edge portion 15 is also aerated. With this arrangement it should also be noted that air under pressure passes through fabric diffuser 7 right down to the base 5 of the aerator which is, for all practical purposes, flush with the inner face of wall 3. Therefore, it is obvious why my aerator offers practically no obstruction to the flow of powdered material down the bin wall.

From the above it is evident that I have provided an aerator which is of simple structure, economical to make and which can be subjected to considerable handling abuse without in any wise injuring the aerator. It should also be noted that since the fabric diffuser is made of a flexible woven fabric, whether dust arrester cloth or relatively heavier multiple ply cotton belting, that in those cases where the aerator is used with hot material the difference in relative expansion of the metal base and the fabric diffuser is unimportant because the flexibility of the fabric diffuser permits the fabric to stretch without breaking or cracking and thereby accommodate the expansion of the supporting base.

The peripheral edge of the fabric web has an air-tight seal with the periphery of the base member so that the air will all pass through the woven fabric web and cannot bypass or leak around the edges thereof. The seal is effected by the rolled back peripheral edge of the base member.

The fact that the permeability of fabric 7 of my aerator is such that it will pass more air at any given pressure than will pass through orifice 21 at that pressure (that is, the total area of the pores in fabric 7 is greater than the area of orifice 21) is very advantageous. When a plurality of aerators are connected in parallel to a common air feed pipe no one of the aerators will rob or starve the others because orifices 21 will control the air flow to each aerator. Further, this arrangement permits accurate control of the air flow through each aerator irrespective of whether the pulverulent material on the fabric 7 is being maintained in an aerated condition or whether the pulverulent material has settled upon the aerator fabric in a de-aerated condition and aeration is being initiated.

I claim:

1. An aerating device adapted for aerating pulverulent material comprising in combination an imperforate flat thin metal base having an inlet therein and a web of woven fabric covering said base and secured to the peripheral edge of said base, means between the base and web for spacing a substantial portion of the web from said base whereby the fabric web and base cooperate to form a chamber adapted to receive gas under pressure through said inlet and diffuse the same through said web, said web forming a wall portion opposite to, and spaced from, the imperforate base and side walls connecting the aforementioned wall portion with the peripheral edge of said base whereby air is diffused through said wall portion opposite the base and also through said side walls.

2. An aerating device comprising in combination a substantially flat sheet metal imperforate base having an inlet therein, a foraminated grid mounted over said base and substantially coextensive therewith, a web of woven fabric material mounted over said grid and secured to the base along the periphery of the base, the said base having its peripheral edge rolled back over the peripheral edges of said web and grid to clamp the grid and web to the base and seal the peripheral edges thereof to the base, the area of the web and grid within the periphery of said base being spaced from said base whereby the fabric web, grid and base cooperate to form a chamber adapted to receive gas under pressure through said inlet and diffuse the same through said web, the said grid and web having a central flat portion surrounded by a peripheral side wall portion which is inclined downwardly at an acute angle to the peripheral portion of said base whereby gas under pressure is diffused through substantially the entire area of the web within the periphery of said base.

3. The combination claimed in claim 2 including a nipple secured in the inlet in said base, and means carried by said nipple and cooperating therewith for clamping the aerating device to a supporting wall.

4. An aerating device adapted for aerating a pulverulent material supported by a wall to promote flow of the material along said wall comprising in combination an imperforate base having an inlet therein, said base being adapted for mounting upon the said wall with the inlet substantially coinciding with an opening in said wall, a foraminated grid of wire mesh mounted on said base and secured thereto along the periphery of the base, a web of woven fabric mounted over said grid and secured to the base along the periphery of the base, the area of the web and grid within the periphery of said base being spaced from said base whereby the fabric web, grid and base cooperate to form a chamber adapted to receive gas under pressure through said inlet and diffuse the same through said web into the pulverulent material supported by said wall, the said base being a substantially flat sheet metal plate having its peripheral edge rolled back over the peripheral edges of said web of woven fabric and grid to clamp the grid and web to the base and seal the peripheral edges thereof to the base, and a nipple secured in said inlet and adapted to project through said opening in said wall, and fastening means carried by said nipple and adapted to engage the outer face of said wall for drawing the base against the inside face of said wall and surrounding the opening in said wall whereby the nipple and said means serve to secure said aerator to said wall, the said grid and web being provided with a centrally located flat portion surrounded by a peripheral portion which is inclined downwardly at an acute angle to the peripheral portion of said base.

5. An aerating device adapted for aerating pulverulent material comprising in combination an imperforate flat thin metal base having an inlet therein and a web of woven fabric covering said base and secured to the peripheral edge of said base, means between the base and web for spacing a substantial portion of the web from said base whereby the fabric web and base cooperate to form a chamber adapted to receive gas under pressure through said inlet and diffuse the same through said web, said web forming a wall opposite the imperforate base and side walls connecting the aforementioned wall with the peripheral edge of said base whereby air is diffused through said wall opposite the base and also through said side walls, the said side walls being inclined inwardly from the peripheral edge of the base and the included angle between the side walls and said base being substantially less than a right angle.

6. An aerating device adapted for aerating pulverulent material comprising in combination an imperforate base having an inlet therein, a foraminated grid mounted over said base and substantially coextensive therewith, a web of woven fabric material mounted over said grid and secured to the base along the periphery of the base, the area of the web and grid within the periphery of said base being spaced from said base whereby the fabric web, grid and base cooperate to form a chamber adapted to receive gas under pressure through said inlet and diffuse the same through said web, the said grid and web having a central flat portion surrounded by a peripheral side wall portion whereby gas under pressure is diffused through substantially the entire area of the web within the periphery of said base.

7. An aerating device adapted for aerating pulverulent material comprising in combination an imperforate base having an inlet therein, a foraminated grid mounted over said base, a web of woven fabric material mounted over said grid, the said web of woven fabric material and grid being substantially co-extensive and secured along their peripheries to the base, the area of the web and grid within their peripheries being spaced from said base whereby the fabric web, grid and base cooperate to form a chamber adapted to receive gas under pressure through said inlet and diffuse the same through said web, the said grid and web having a central portion surrounded by a peripheral side wall portion whereby gas under pressure is diffused through substantially the entire area of the web within its peripheral junction with said grid and base.

8. The combination claimed in claim 7 wherein the central portion of the grid and web is substantially planar and the surrounding peripheral side wall portion is inclined downwardly at an acute angle to the peripheral portion of said base.

9. The combination claimed in claim 2 including a baffle positioned opposite said inlet and between said inlet and said grid whereby gas flowing through said inlet into said aerating device strikes said baffle which spreads the gaseous stream before the gas passes through the fabric web.

10. The combination claimed in claim 9 including a plurality of legs for supporting said baffle upon said base, the said baffle also serving as a support for said grid to maintain the same spaced from said base.

GEORGE A. SCHEMM.

References Cited in the file of this patent

UNITED STATES PATENTS

| Number | Name | Date |
|---|---|---|
| 250,331 | Atwood et al. | Dec. 6, 1881 |
| 667,005 | Davis | Jan. 29, 1901 |
| 1,007,555 | Gober | Oct. 31, 1911 |
| 1,215,974 | Orem | Feb. 13, 1917 |
| 2,011,133 | Yoss | Aug. 13, 1935 |
| 2,035,097 | Schwartz | Mar. 24, 1936 |
| 2,123,537 | Marr | July 12, 1938 |
| 2,125,913 | Goebels | Aug. 9, 1938 |
| 2,292,897 | Nielsen | Aug. 11, 1942 |